Sept. 27, 1927.

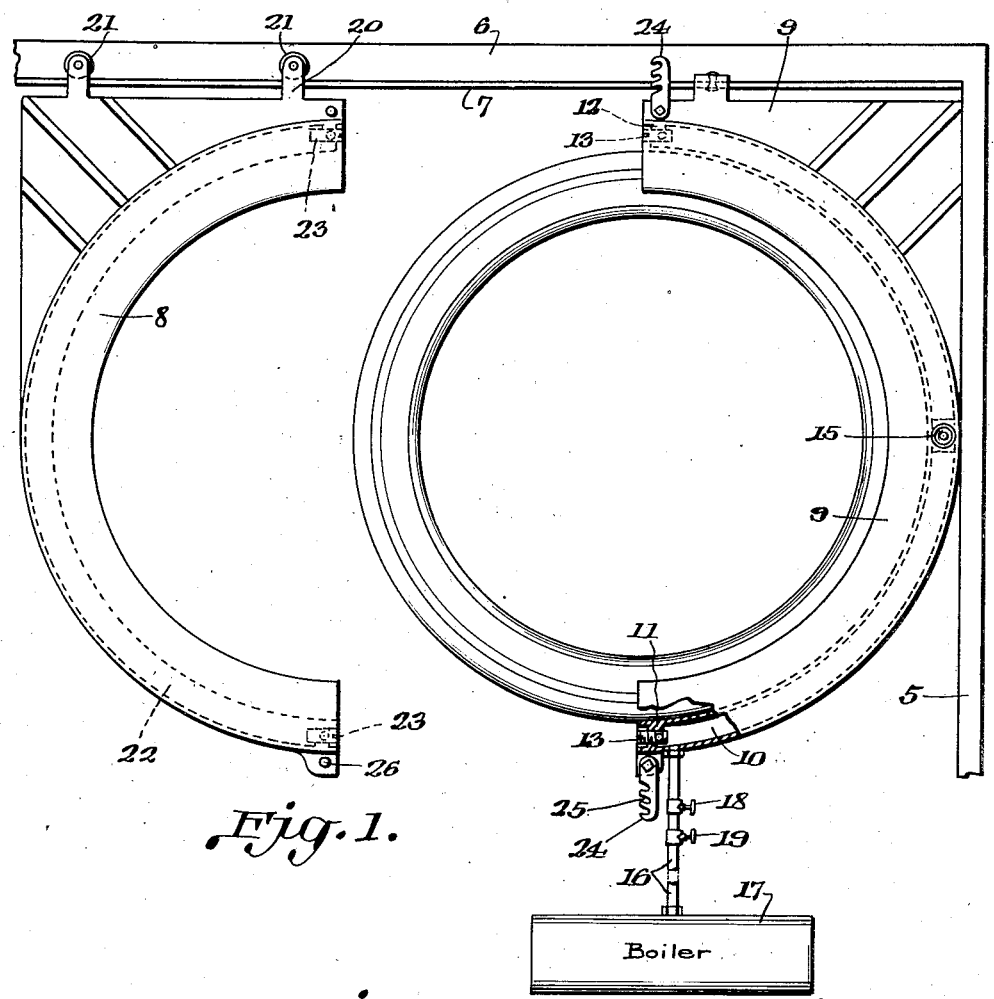

W. P. HENSON

TIRE MOLD

Filed Oct. 2, 1926   2 Sheets-Sheet 2

Inventor
W. P. Henson

Patented Sept. 27, 1927.

1,643,712

UNITED STATES PATENT OFFICE.

WILLIAM P. HENSON, OF SACRAMENTO, CALIFORNIA.

TIRE MOLD.

Application filed October 2, 1926. Serial No. 139,147.

This invention relates to tire molds and more particularly to a tire mold especially designed for applying rubber to the treads of worn out tire casings to retread the casings.

An important object of the invention is to provide a mold of this character wherein the heating element or steam may be confined to a particular portion of the mold for retreading only a small portion of the casing if desired.

A still further object of the invention is to provide a sectional mold, novel means being provided for supporting the sections and holding the sections into close engagement with each other to insure against the steam, employed as a heating medium escaping from between the sections.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a mold and its supporting structure constructed in accordance with the invention.

Figure 2 is an elevational view of the locking bolt for locking the sections together.

Figure 3 is an end elevational view of the bolt.

Figure 4 is a modified form of eccentric bolt.

Figure 5 is an end elevational view thereof.

Figure 6:
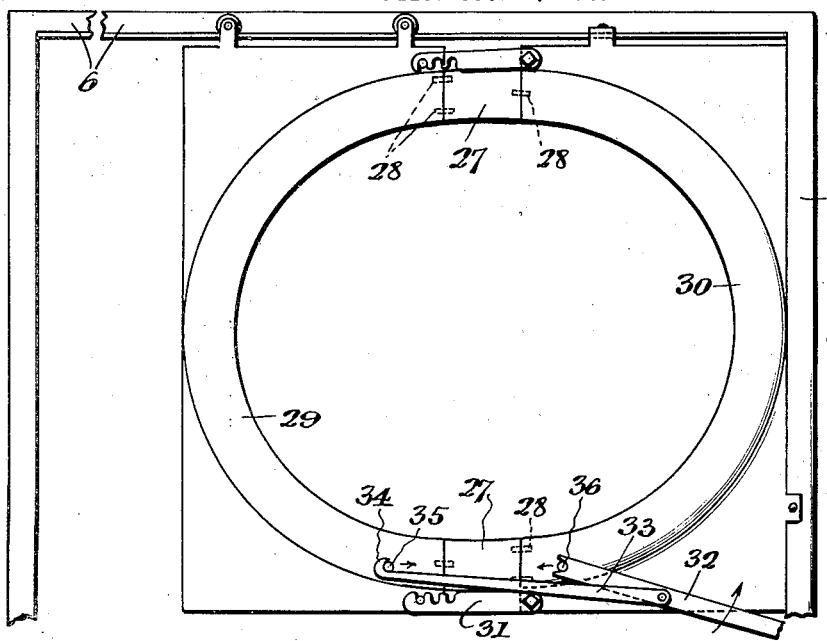
Figure 6 is a side elevational view of a mold wherein a splice is employed.

Referring to the drawings in detail, the reference character 5 indicates vertical bars at the ends of the supporting rail 6, which supporting rail is formed with lateral flanges 7 defining a track for the movable mold section 8 to be hereinafter more fully described.

The mold includes a stationary section 9 which is secured against movement within the supporting structure, and as shown, the section 9 is formed with a passageway 10 through which steam, which is employed as the heating medium may pass.

The inner portion of the mold section 8 is concaved and constructed to conform to the curvature of the periphery of a tire, with the result that a close fit will be had between the tire positioned within the mold and the mold.

The passageway 10 is formed with walls 11 and 12 respectively at its ends, which walls are formed with threaded openings to receive the valve members 13 that are hollow and formed with lateral openings 14 so that the steam may pass through the valve members and out through the openings 14 where the steam may pass to the passageway of the adjacent section.

The mold section 9 is also formed with a partitioning member in which the valve 15 moves, the partitioning member and valve being disposed intermediate the ends of the mold section 9 so that the steam or heating medium may be confined to any portion of the mold section.

A steam pipe indicated at 16 has communication with the chamber 10 and supplies steam thereto, the pipe being also in communication with the boiler 17 heated by a suitable burner not shown. Valves 18 and 19 are provided in the steam pipe 16, so that steam may be directed to the passageway 10, and as shown, the valve member 18 is of such construction that when the valve 18 is opened, communication between the passageway 10 and atmosphere will be established, with the result that dead steam in the passageway 10 may be released.

The movable section 8 is substantially the same in construction as the section 9, except arms 20 are provided thereon and extend upwardly where they support the wheels 21 that move over the track section 7, with the result that the section 8 may be moved towards or away from the section 9 to facilitate the positioning of a casing within the mold.

This section 8, like the section 9 is formed with a passageway 22 that has walls at its ends which walls are formed with threaded openings to receive the valve members 23 that are identical with the valve members 13, and which may be operated to cut off the passage of steam through the passageway 22, or establishing communication between the passageway 22 and the passageway 10, when the mold sections are brought together.

The reference character 24 indicates pivoted latch members that are secured to opposite sides of the mold section 9 at points adjacent to its ends, which latch members are formed with a plurality of notches 25 that fit over the pins 26 extending laterally from the mold section 8, so that when the sections are brought together they may be locked in their connected positions.

As shown by Figure 6, removable sections 27 are provided and connected to the mold sections by means of the pins 28 carried by the removable sections 27, the pins fitting in suitable openings formed in the mold sections, which in this form of the invention are indicated by the reference characters 29 and 30 respectively.

When this form of the invention is used, it will be seen that tires of various diameters may be treated by positioning or removing the sections 27 so that the mold will be of the proper diameter.

Latch members 31 are also used for locking the mold sections together, while the sections are drawn to their active positions by means of the levers 32 and 33, the lever 32 having a hooked end fitted over the pin 35, the lever 32 being formed with a notch to fit over the pin 36. Thus it will be seen that when the upper latch members 31 are moved to hold the sections together, the lever 32 may be operated to move the lower ends of the sections into close engagement, where the lower latch members 31 may be locked.

Figure 7:
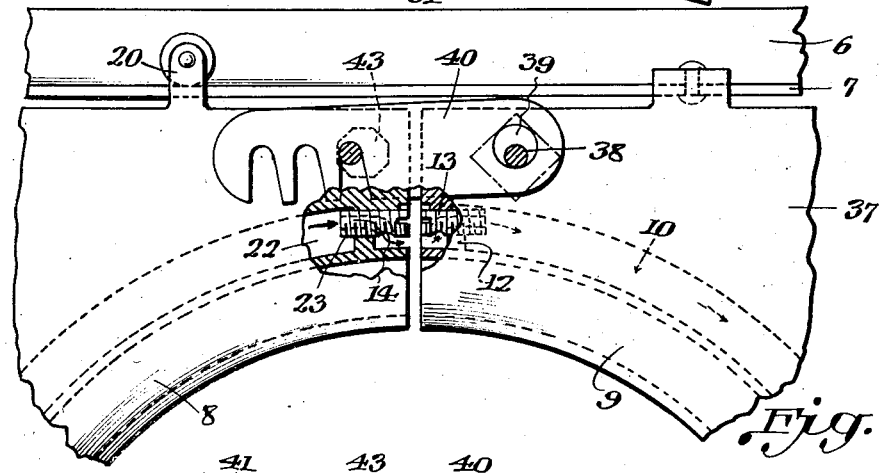
Figure 7 is an enlarged detail view partly broken away illustrating the manner of drawing the mold sections together.
Figure 8:
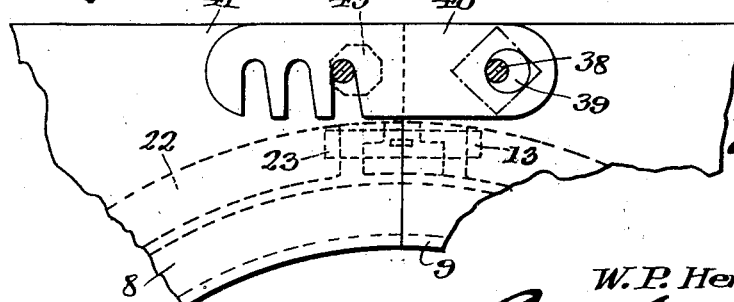
Figure 8 is an enlarged elevational view illustrating the positions of the mold sections when moved to engage each other.

In the modified form of the invention as shown by Figures 7 and 8, the mold section 37 is formed with a bore in which the bolt 38 operates, the bolt 38 being provided with an offset portion 39 designed so that when the bolt is rotated, the sections will be moved towards or away from each other. The latch members have square openings to accommodate the square ends of the bolt to prevent rotation of the bolt after it has been properly positioned.

The latch members 40 are mounted on the bolt 38 and move therewith. An octagonal opening is formed in the cooperating mold section 41 and accommodates the bolt 42 provided with an octagonal offset portion 43, so that should the wear caused by the operation of the device form a space between the sections, the bolt 42 may be removed and again positioned in such a way that the bolt will be moved away from the substantially square opening formed in the adjacent mold section, so that when the bolt 38 is operated or moved to a position as shown by Figure 8, the mold sections will again be brought into close engagement with each other.

In the use of the device, a tire, if the entire outer surface thereof is to be retreaded, is positioned within the mold and the sections brought together and locked. Steam is now admitted to the passageways of the mold sections whereupon the retread, which is of course treated with suitable material to cause the retread to adhere to the casing, will become molded to the casing.

Should it be desired to only retread a particular portion of the tire, the operator may by operating the various valves confine the steam to that particular portion of the mold engaged by the casing.

When the sections of the mold as illustrated by Figures 7 and 8 are to be brought together, it is obvious that the latch members are moved to positions as shown by these Figures 7 and 8, whereupon the bolt 38 is moved to a position as shown by Figure 8, the offset portion thereof engaging the surface of the square opening to draw the sections together.

I claim:

1. A tire mold including a supporting rail, mold sections, rollers on one of the sections to movably support the section equipped therewith, said sections having curved inner surfaces to support a tire therein, said sections having steam passageways, means for closing the ends of the steam passageway of one of the sections, and means for directing steam to the passageways.

2. A tire mold including a supporting rail, mold sections, one of the sections being secured to the rail, rollers on the opposite section to movably support the sections, said mold sections having curved tire receiving surfaces, said sections having steam passageway, means for establishing communication between the steam passageways when the sections are moved together, one of said sections having bores adjacent to its ends, latch members, bolts having offset portions mounted in the bores and connected with the latch members, said latch members having square openings, said bolts having squared end portions fitted in the square openings to hold the bolt against movement, and means for directing steam to the steam passageways.

In testimony that I claim the foregoing as my own, I have hereto affixed my signature.

WILLIAM P. HENSON.